W. S. SUMNER.
ANTIGLARE ATTACHMENT.
APPLICATION FILED JULY 2, 1920.
1,368,986.
Patented Feb. 15, 1921.
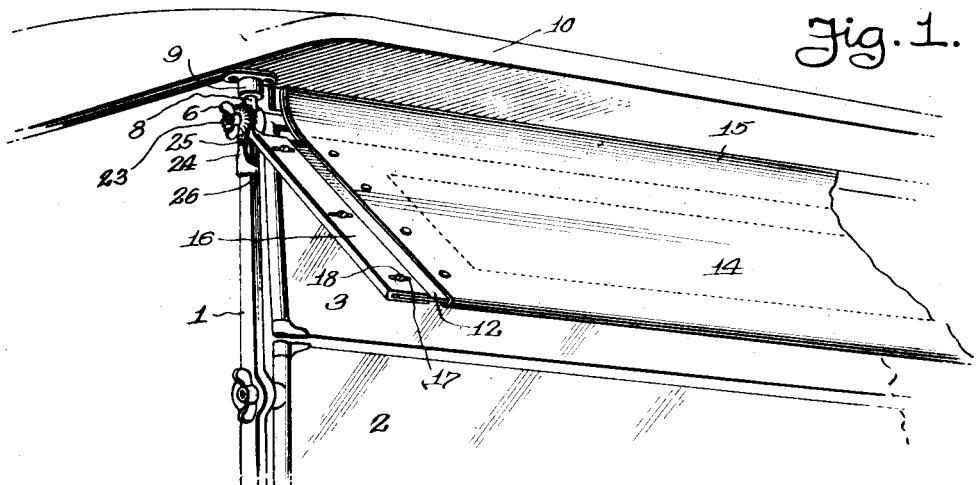
Fig. 1.
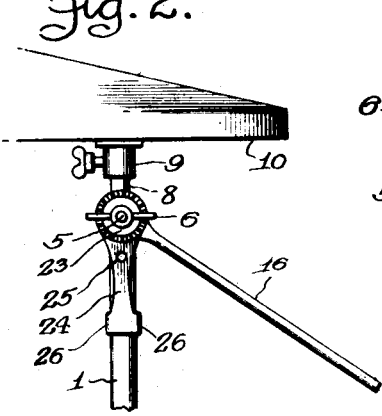
Fig. 2.
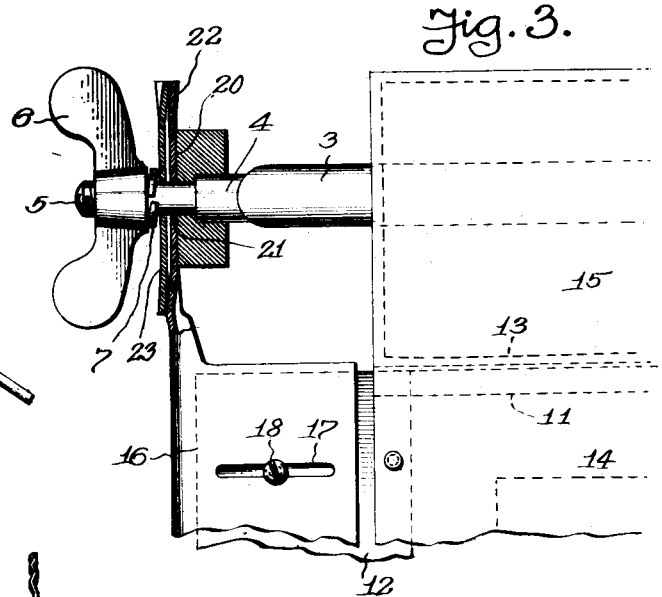
Fig. 3.
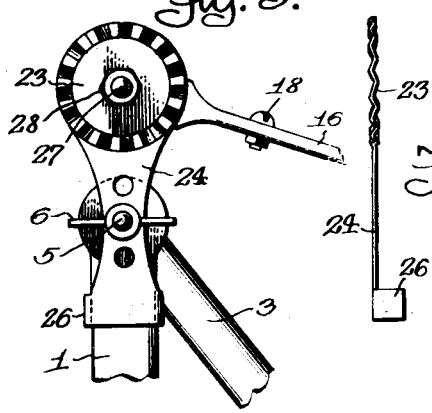
Fig. 5.
Fig. 6.
Fig. 4.
Inventor
Warren S. Sumner,
By
Attorneys

UNITED STATES PATENT OFFICE.

WARREN S. SUMNER, OF HIGHLAND PARK, MICHIGAN.

ANTIGLARE ATTACHMENT.

1,368,986.     Specification of Letters Patent.     Patented Feb. 15, 1921.

Application filed July 2, 1920. Serial No. 393,538.

*To all whom it may concern:*

Be it known that I, WARREN S. SUMNER, a citizen of the United States of America, residing at Highland Park, in the county of Wayne and State of Michigan, have invented certain new and useful Improvements in Antiglare Attachments, of which the following is a specification, reference being had therein to the accompanying drawings.

On account of many makes of automobiles having especially designed windshields, there are various sizes of windshields and any windshield attachment which is to be universally used must be applicable to all sizes and types of windshields.

The primary object of my invention is to provide an anti-glare attachment for windshields and automobile bodies which may be adjusted to compensate for the size, inequalities of windshields and automobile bodies, the attachment being constructed so that its width may be increased and decreased and its attachment to a windshield accomplished at a desired height relative to the exterior of the windshield or an automobile top.

A further object of my invention is to provide novel pieces of hardware by which a shade or anti-glare device may be supported and adjusted on an automobile to relieve a driver from eyestrain due to glaring headlights, blinding sunlight and snow covered windshields;—all of which have caused many accidents.

The above and other objects are attained by an attachment which has gone into extensive use, and the construction entering into the attachment will be hereinafter described and then claimed.

Reference will now be had to the drawing, wherein—

Figure 1 is a perspective view of the antiglare attachment showing the same applied to a portion of an automobile;

Fig. 2 is a side elevation of the anti-glare attachment on a portion of a windshield;

Fig. 3 is an enlarged plan of a portion of the attachment, partly broken away and partly in section;

Fig. 4 is an edge view of one of the members of the attachment;

Fig. 5 is an enlarged side elevation of a portion of the attachment, illustrating one of the members of the attachment, and Fig. 6 is an edge view of an attachment member used in connection with a closed body of an automobile.

In the drawing, the reference numeral 1 denotes one of two side frames or members pivotally supporting a lower sash 2 and upper sash 3, said sashes coöperating with the side frames 1 in providing a conventional form of windshield for an automobile or similar vehicle. The upper end of the frame 1 provides a bearing for the pintle 4 of the sash 3 and the pintle 4 ordinarily terminates in a screwthreaded stem 5 provided with a winged thumb nut 6 which is tightened against the frame 1 to hold the upper sash 3 in an adjusted position relative to the side frame 1. A split resilient washer 7 is often interposed between the nut 6 and the frame 1, and the upper end of the frame ordinarily terminates in a pin 8 to extend into a socket 9 carried by an automobile top 10, so that the automobile top may be supported by the windshield and have a fixed relation thereto. The construction just described is of the usual well known type of windshield for supporting the forward end of an automobile top, and my attachment has been designed to be held by the pivotal means of the upper sash 3 and be applicable to any width of windshield now in use. The attachment is also made so that it may be positioned at a desired height relative to the upper edge of the sash 3 and the forward end of the automobile top, and the construction contributing to these results will now be described.

The anti-glare device comprises a main frame having longitudinal members 11 and flat end members 12. In addition to the main frame there is an oblong flap frame 13 and these two frames are suitably covered with leather or any suitable waterproof material so as to form a shade 14 with a flap 15 at the upper edge thereof. The cover for the frame 11 is of less length than said frame so as to leave the flat end members 12 bared or exposed and in some instances the frame 13 may be made of flexible material or entirely dispensed with particularly when plies of the cover are of sufficient pliability to maintain the flap 15.

Telescoping the flat end members 12 are channel members 16, each having a plurality of slots 17 through which extends screws 18 carried by the end member 12, such connection permitting of the channel member 16 being shifted on the end member 12 so as to increase or decrease the longitudinal dimension of the shade. With the screws 18 loose, the channel members 16 may be set a desired distance from the end of the shade cover and then by tightening the screws the channel members 16 and the end members 12 will be held together as though integral.

The upper end of the channel member 16 has an interlocking circular head or member 20 provided with a central aperture 21 so that the interlocking member 20 may be mounted on the stem 5 of the windshield pintle 4, and the central portion of said interlocking member is comparatively flat while the peripheral edges thereof are rolled, pressed or otherwise formed with radially disposed teeth 22, the teeth 22 providing a scalloped or roughened friction surface by which another interlocking member 23 may be clamped in engagement therewith. The member 23 has a central aperture to receive the stem 5, and said member is similar to the member 20 so that said members may be placed in parallel interlocking engagement and frictionally held together by the nut 6 and the washer 7, said washer being interposed between the nut and the member 23. The member 23 is carried by an arm 24 having one or more apertures 25 and side ears or a channel portion 26 at that end of the arm opposite the member 23.

As best shown in Figs. 1 and 2, the arm 24 is parallel with the side frame 1 and the lower end of said arm embraces the side frame so as to prevent the arm from turning. With the members 20 and 23 on the stem 5 of the pintle 4 which has bearing in the frame 1, the members 23 and 20 may be locked in engagement with each other, by tightening the nut 6, so that one member cannot move relative to the other, but in practice the nut 6 is tightened so that the member 20 can be shifted by hand relative to the member 23, and this takes place when the shade 14 is raised and lowered relative to the upper sash 3 of the windshield. It is therefore possible for the driver of an automobile to shift the shade 14 to a desired inclination, to protect the eyes and yet not obscure the vision for driving purposes. Of course, after the shade 14 has been properly adjusted it is possible to tighten the nut 6 so as to more firmly hold the shade and thus prevent accidental shifting thereof particularly when the automobile is subjected to vibrations due to a rough road. With the ends of the shade supported on the pivotal means of the upper sash 3 the flap 15 can engage the top 10, as shown in Fig. 1, and thus prevent the elements from passing into the automobile between the top of the windshield and the usual canopy top 10.

As pointed out in the beginning there are windshields which vary in height with sufficient space between the top of the windshield and the automobile top to permit of the shade being elevated relative to the windshield. Then again, when the automobile top is not in use it may be desired to place the shade at a greater elevation than what could be obtained by mounting the shade as shown in Fig. 2. For these reasons the arm 24 is of sufficient length to be raised on the frame 1 with the stem 5 of the windshield pintle 4 extending through one of the apertures 25, as shown in Fig. 5. This will place the members 20 and 23 above the windshield and the members can be connected by a bolt 27 and a nut 28 or any suitable pivotal means which will retain the members 20 and 23 in frictional contact to permit of the shade 14 being adjusted relative to the windshield.

For an automobile having a closed body members 29 may be employed which have brackets 30, and the brackets 30 can be fixed to an automobile body with the members thereof protruding at the front window of the body so that the members 20 may be interlocked with the members 29 by using the bolt 27 and the nut 28 or similar pivotal means.

From the foregoing it will be observed that I have devised novel shade fixtures for a windshield which permits of a shade having its upper edge supported at the upper edge of the windshield sash or some distance above the windshield sash, and it is through the medium of these universal fixtures that a shade in acordance with my invention, is applicable to various types of windshields.

What I claim is:—

1. Shade fixtures for windshields comprising interlocked friction members with some of said members supporting a shade and the other of said members provided with a series of apertures to receive portions of the windshield and support said interlocked friction members in a plane above the windshield.

2. The combination with windshield frames and a sash having pintles journaled in said frames, of interlocking members, arms carried by some of said interlocking members and having a series of openings to receive the sash pintles, so that said interlocking members may be supported above said pintles, channel members carried by other of said interlocking members, a shade having its ends adjustable in said channel members.

3. The combination of a vizor, hardware therefor so that the vizor may be attached to a wind shield, comprising arms fitted on pintles of the windshield and having ends engaging the windshield to prevent rotation of said arms, and interlocked members at the upper ends of said arms supporting said vizor.

In testimony whereof I affix my signature in presence of two witnesses.

WARREN S. SUMNER.

Witnesses:
   ANNA M. DORR,
   KARL H. BUTLER.